US008655867B2

(12) United States Patent
Collins et al.

(10) Patent No.: US 8,655,867 B2
(45) Date of Patent: Feb. 18, 2014

(54) METHOD AND SYSTEM FOR OPTIMIZING QUERIES IN A MULTI-TENANT DATABASE ENVIRONMENT

(75) Inventors: Jesse Collins, San Francisco, CA (US); Jaikumar Bathija, Fremont, CA (US)

(73) Assignee: Salesforce.com, Inc., San Francisco, CA (US)

( * ) Notice: Subject to any disclaimer, the term of this patent is extended or adjusted under 35 U.S.C. 154(b) by 166 days.

(21) Appl. No.: 13/014,115

(22) Filed: Jan. 26, 2011

(65) Prior Publication Data

US 2011/0282864 A1  Nov. 17, 2011

Related U.S. Application Data

(60) Provisional application No. 61/395,457, filed on May 13, 2010.

(51) Int. Cl.
*G06F 7/00* (2006.01)

(52) U.S. Cl.
USPC .......................................... 707/719; 707/713

(58) Field of Classification Search
None
See application file for complete search history.

(56) References Cited

U.S. PATENT DOCUMENTS

| | | | |
|---|---|---|---|
| 5,715,450 A | 2/1998 | Ambrose et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| 6,341,277 B1 * | 1/2002 | Coden et al. | 707/718 |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,549,908 B1 | 4/2003 | Loomans | |
| 6,553,563 B2 | 4/2003 | Ambrose et al. | |
| 6,574,635 B2 | 6/2003 | Stauber et al. | |
| 6,577,726 B1 | 6/2003 | Huang et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,697,818 B2 * | 2/2004 | Li et al. | 1/1 |

(Continued)

*Primary Examiner* — Apu Mofiz
*Assistant Examiner* — Thu Nga Nguyen
(74) *Attorney, Agent, or Firm* — David Lewis; Marc Balban

(57) ABSTRACT

In accordance with embodiments, there are provided mechanisms and methods for query optimization in a database system. These mechanisms and methods for query optimization in a database system can enable embodiments to optimize OR expression filters referencing different logical tables. The ability of embodiments to optimize OR expression filters referencing different logical tables can enable optimization that is dynamic and specific to the particular tenant for whom the query is run and improve the performance and efficiency of the database system in response to query requests.

14 Claims, 7 Drawing Sheets

(56) References Cited

U.S. PATENT DOCUMENTS

| | | |
|---|---|---|
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,768,904 B2 | 7/2004 | Kim |
| 6,775,681 B1 * | 8/2004 | Ballamkonda et al. ....... 707/718 |
| 6,782,383 B2 | 8/2004 | Subramaniam et al. |
| 6,804,330 B1 | 10/2004 | Jones et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,209,929 B2 | 4/2007 | Dominguez, Jr. et al. |
| 7,529,728 B2 | 5/2009 | Weissman et al. |
| 7,734,608 B2 | 6/2010 | Fell et al. |
| 7,814,052 B2 | 10/2010 | Bezar et al. |
| 7,827,138 B2 | 11/2010 | Salmon et al. |
| 8,131,713 B2 | 3/2012 | Weissman et al. |
| 8,150,833 B1 | 4/2012 | Scotton et al. |
| 8,156,085 B2 | 4/2012 | Dominguez, Jr. et al. |
| 8,201,023 B2 | 6/2012 | Chen |
| 8,204,855 B2 | 6/2012 | Salmon et al. |
| 8,229,922 B2 | 7/2012 | Weissman et al. |
| 8,234,290 B2 | 7/2012 | Hofhansl et al. |
| 8,266,138 B1 | 9/2012 | Collins et al. |
| 8,275,763 B2 | 9/2012 | Weissman et al. |
| 8,280,874 B2 | 10/2012 | Weissman et al. |
| 8,280,875 B2 | 10/2012 | Weissman et al. |
| 8,321,405 B2 | 11/2012 | Weissman et al. |
| 8,332,387 B2 | 12/2012 | Weissman et al. |
| 8,335,781 B2 | 12/2012 | Weissman et al. |
| 8,386,471 B2 | 2/2013 | Collins et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2007/0124276 A1 | 5/2007 | Weissman et al. |
| 2007/0130137 A1 | 6/2007 | Oliver et al. |
| 2008/0077566 A1 | 3/2008 | Fell et al. |
| 2008/0082555 A1 | 4/2008 | Salmon et al. |
| 2009/0276395 A1 | 11/2009 | Weissman et al. |
| 2010/0070528 A1 | 3/2010 | Collins et al. |
| 2010/0114912 A1 | 5/2010 | Hofhansl et al. |
| 2010/0191719 A1 | 7/2010 | Weissman et al. |
| 2010/0205165 A1 | 8/2010 | Fell et al. |
| 2010/0217758 A1 | 8/2010 | Weissman et al. |
| 2010/0223254 A1 | 9/2010 | Weissman et al. |
| 2010/0223255 A1 | 9/2010 | Weissman et al. |
| 2010/0235837 A1 | 9/2010 | Weissman et al. |
| 2010/0274779 A1 | 10/2010 | Weissman et al. |
| 2010/0281014 A1 | 11/2010 | Weissman et al. |
| 2010/0281016 A1 | 11/2010 | Weissman et al. |
| 2011/0004668 A1 | 1/2011 | Salmon et al. |
| 2011/0082854 A1 | 4/2011 | Eidson et al. |
| 2011/0246419 A1 | 10/2011 | Yancey et al. |
| 2011/0246449 A1 | 10/2011 | Collins et al. |
| 2011/0253179 A1 | 10/2011 | Barrios et al. |
| 2011/0282847 A1 | 11/2011 | Collins et al. |
| 2011/0282864 A1 | 11/2011 | Collins et al. |
| 2011/0282881 A1 | 11/2011 | Collins et al. |
| 2011/0289091 A1 | 11/2011 | Collins et al. |
| 2011/0295838 A1 | 12/2011 | Collins et al. |
| 2011/0295839 A1 | 12/2011 | Collins et al. |
| 2011/0302222 A1 | 12/2011 | Kucera et al. |
| 2011/0320435 A1 | 12/2011 | Collins et al. |
| 2012/0023375 A1 | 1/2012 | Dutta et al. |
| 2012/0042208 A1 | 2/2012 | Chen |
| 2012/0084300 A1 | 4/2012 | Oliver et al. |
| 2012/0089602 A1 | 4/2012 | Oliver et al. |
| 2012/0089647 A1 | 4/2012 | Jagota et al. |
| 2012/0131068 A1 | 5/2012 | Scotton et al. |
| 2012/0151062 A1 | 6/2012 | Gusev et al. |
| 2012/0173485 A1 | 7/2012 | Kothule et al. |
| 2012/0233354 A1 | 9/2012 | Salmon et al. |
| 2012/0310931 A1 | 12/2012 | Oliver et al. |
| 2012/0330924 A1 | 12/2012 | Rajan et al. |
| 2012/0330926 A1 | 12/2012 | Rajan et al. |
| 2013/0018890 A1 | 1/2013 | Rajan et al. |
| 2013/0046752 A1 | 2/2013 | Weissman et al. |
| 2013/0054582 A1 | 2/2013 | Macklem et al. |
| 2013/0054648 A1 | 2/2013 | Mehta et al. |

* cited by examiner

METHOD AND SYSTEM FOR OPTIMIZING QUERIES IN A MULTI-TENANT DATABASE ENVIRONMENT

CLAIM OF PRIORITY

This application claims the benefit of U.S. Provisional Patent Application 61/395,457 entitled METHOD AND SYSTEM FOR OPTIMIZING QUERIES IN A MULTI-TENANT DATABASE ENVIRONMENT, by Jesse Collins et al., filed May 13, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 13/014,115 entitled METHOD AND SYSTEM FOR OPTIMIZING QUERIES IN A MULTI-TENANT DATABASE ENVIRONMENT, by Jesse Collins et al., filed Jan. 26, 2011.

FIELD OF THE INVENTION

The current invention relates generally to query optimization in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Additionally, function names used are generally descriptive of what the functions perform and may be replaced by a function having a different name but capable of performing the same tasks or steps.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid and efficient retrieval of accurate information and subsequent delivery of this information to the user system has been and continues to be a goal of administrators of database systems.

Unfortunately, conventional database approaches might process a query relatively slowly if, for example, optimizing queries involving OR expression filters are only applicable when each filter in the OR expression refers to the same logical data table. If a user runs a query with an OR expression where each term in the OR expression is optimizable and all the terms are based on the same query table, the query may be optimized. For example, if a user runs a query, "Select Id from Contact where Name=X or email=Y", it may be optimized because all terms are based on the same query table. However, queries such as, "Select Id from Contact where Name=X or Account.Name=X" may be out of scope because the OR expression spans two query tables, contact and account. Developers may desire to be able to efficiently and dynamically optimize queries that reference multiple data tables and not be limited to optimizing queries of a single data table.

Accordingly, it is desirable to provide techniques enabling the optimization of queries involving multiple query tables to improve the performance and efficiency of the database system.

BRIEF SUMMARY

In accordance with embodiments, there are provided mechanisms and methods for query optimization in a database system. These mechanisms and methods for query optimization in a database system can enable embodiments to optimize OR expression filters referencing different logical tables. The ability of embodiments to optimize OR expression filters referencing different logical tables can enable optimization that is not limited to queries of a single data table and may be dynamic and specific to the particular tenant for whom the query is run and improve the performance and efficiency of the database system in response to query requests.

In an embodiment and by way of example, a method for query optimization in a database system is provided. The method embodiment of handling OR expressions involving multiple tables includes splitting the entire query into a set of multiple parallel subqueries, where each subquery may be obtained from a single term from the OR expression, and each subquery may be fully optimized according to a query optimizer, and the costs of the multiple subqueries are added together in order to get a cost which can be compared against other optimizable filters in the same query.

While the present invention is described with reference to an embodiment in which techniques for query optimization in a database system are implemented in a system having an application server providing a front end for an on-demand database service capable of supporting multiple tenants, the present invention is not limited to multi-tenant databases, is not limited to databases, and is not limited to deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Systems and methods are provided for query optimization in a database system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing query optimization in a database system are described with reference to example embodiments.

System Overview

Figure 1:
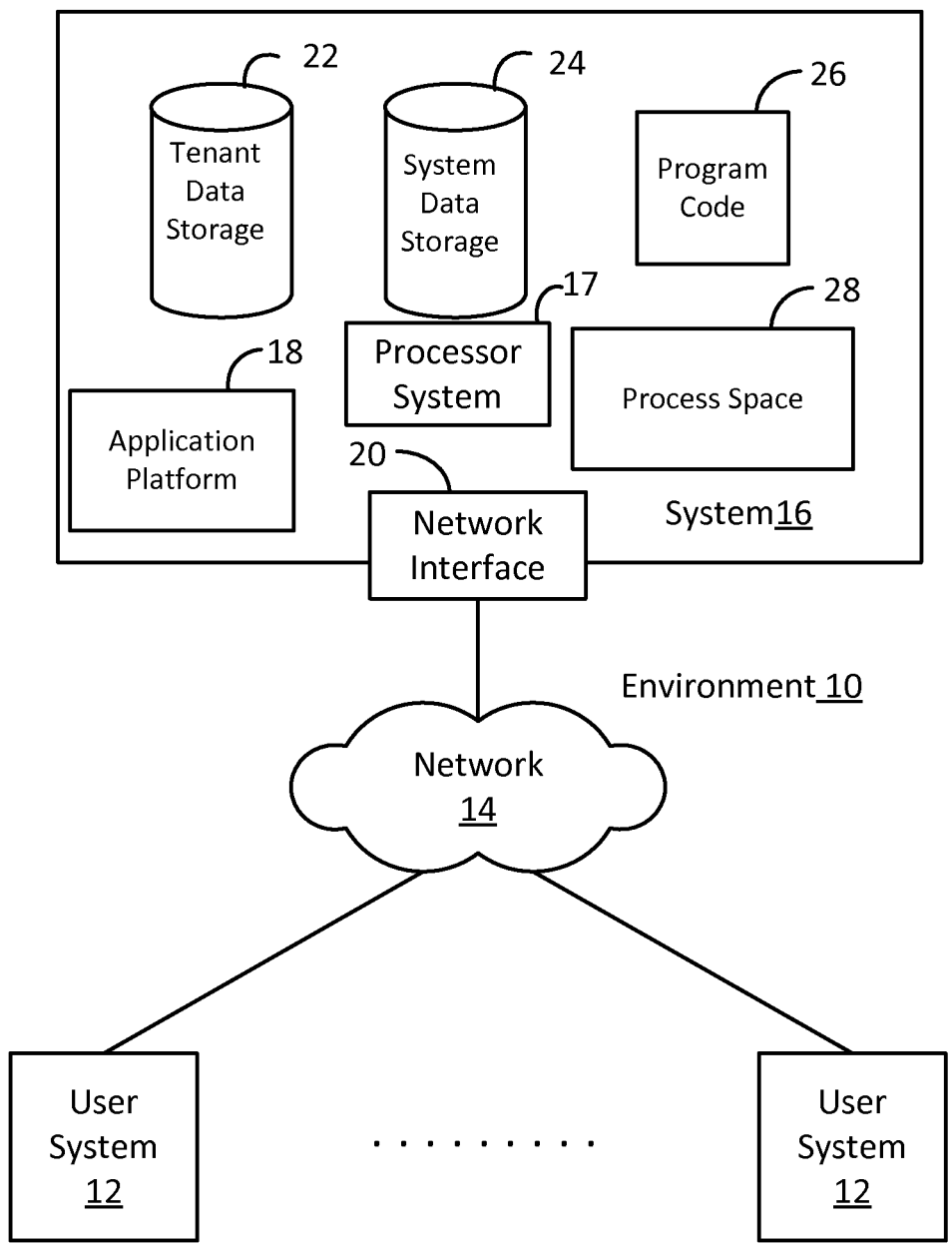
FIG. 1 illustrates a block diagram of an example of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein.

Similarly, the database object described herein can be implemented as single databases, a distributed database, a collection of distributed databases, a database with redundant online or offline backups or other redundancies, etc., and might include a distributed database or storage network and associated processing intelligence.

Figure 2:
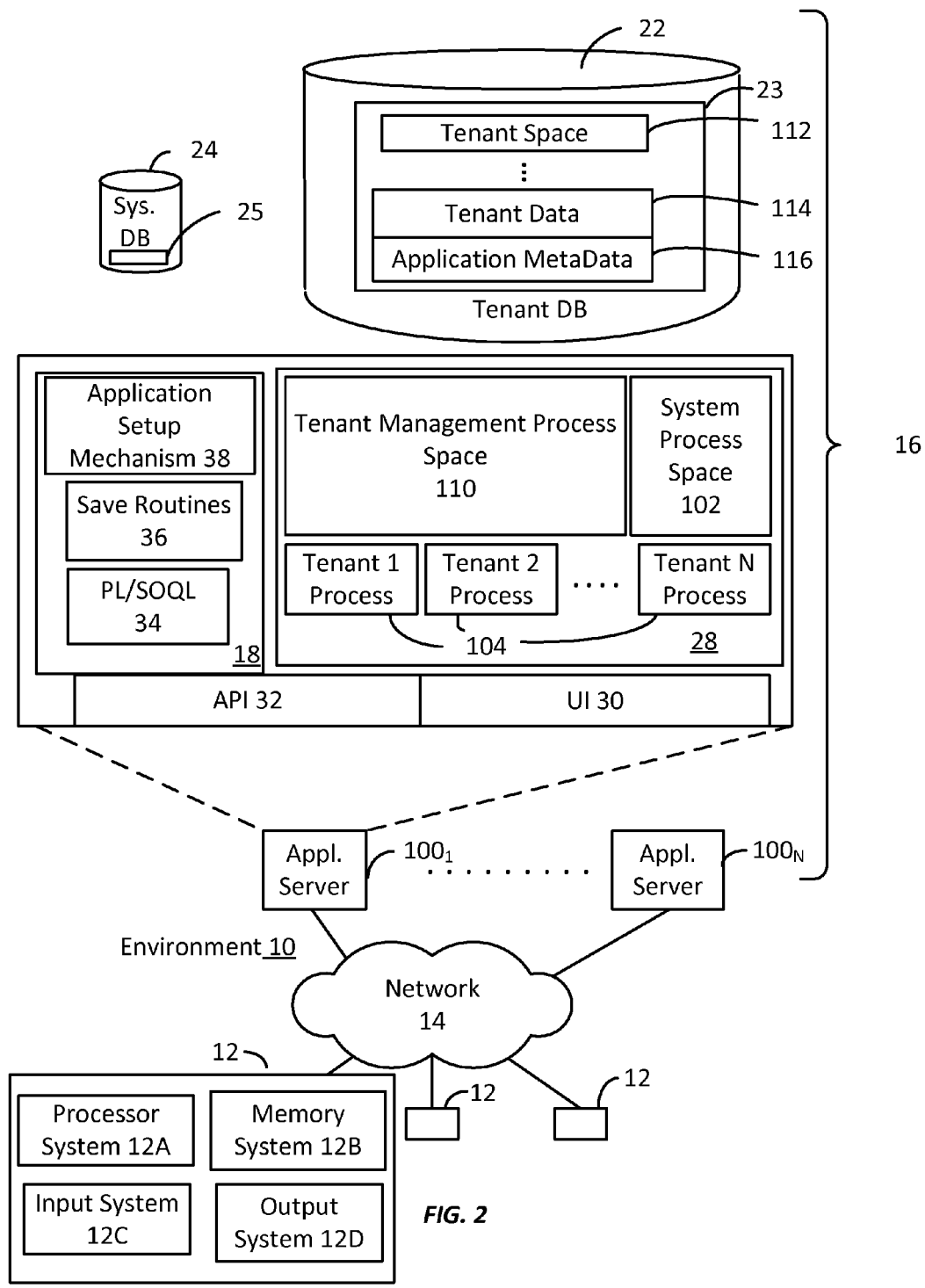
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, "Programming Language Method and System for Extending APIs to Execute in Conjunction with Database APIs," by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multitenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Query Optimization

Prior attempts at optimizing queries involving OR expression filters were only applicable when each filter in the OR expression referred to the same logical data table.

For example in currently used database implementations that optimize queries involving OR expression, when a user runs a query with an OR expression where each term in the OR expression is optimizable and all the terms are based on the same query table, the query is optimized by driving from a UNION subquery that selects the Row Ids matching each term and combines them. Thus, when a user runs a query like "Select Id from Contact where Name=X or email=Y", the query is optimized by using the UNION subquery.

However, in cases where the OR expression filters reference different logical data tables, conventionally, the query is not optimizable. Previous attempts may have been local optimizations that could operate only on a single table and not the query as a whole. An example of an OR expression filter that conventionally is not optimizable is "Select Id from Contact where Name=X or Account.Name=X", since the OR expression spans two query tables, contact and account.

Some installed database systems have the capability to transform a query with an OR expression in the WHERE clause into a UNION. However, these databases rely on global statistics to make the optimization decision, not specific information about a particular tenant, and can only use standard database indexes, not accelerator tables such as custom indexes or search name lookup tables. In an embodiment each tenant may have their own accelerator tables in addition to and/or instead of global accelerator tables.

A new methodology for handling multiple OR expressions involving multiple tables is introduced in embodiments by splitting, with a query parser that detects individual OR clauses, the entire query into a set of multiple parallel subqueries, where each subquery may be driven by a single term from the OR expression. Each of these parallel subqueries may then be fully optimized, and the costs of the multiple subqueries may be added together in order to get a cost which may be compared against other optimizable filters in the same query.

In embodiments, the optimization may be dynamic and specific to the particular tenant of the MTS for whom the query is run; the optimizer may make use of gathered statistics based on the specific tenant's data, and may also use runtime prequeries to gather additional optimization information for the specific query at hand. Thus, in an embodiment, the optimization may be applied only when it may be advantageous for the specific tenant and specific query involved.

A prequery is a query that is run to probe the selectivity of a given filter in order to gain more information for optimization of the main query. The prequeries are designed to be range scans against an index only (without actually accessing the table) to ensure that the prequeries run quickly, and have a row limit to stop the scan as soon as it can be determined that the filter is not selective. A filter selects the available records that need to be checked further to determine if those records meet one or more further search criteria (the available records may be all of the records of the table or may be those records that were selected by other filters that were already applied—some records may be unavailable as a result of the user not having access privileges to those records). A filter is not selective if the filter indicates that all the available records of the table meet the criteria of the filter. If a filter does not select all of the records available, but the number of records selected are so numerous (e.g., the filter selects all records but one), the selection may not be very useful, and the filter may still be referred to as nonselective or as not being selective. An example of determining filter selectivity would be if a user query had a filter on Account Created Date equals today. In that case, a prequery could be run such as:

--- select count(*) from sales.account where
organization_id = :orgId and

```
created_date = :today and
rownum <= :rowlimit
```

The example prequery above would produce a count of the number of rows matching the filter, if the resultant count is a number that is less than a given threshold. As mentioned above, if the resultant count is a number that is greater than the threshold, then the scan is terminated, and consequently the count of the rows is not obtained if the number of rows is more than the threshold. Subsequently, the results of these prequeries are cached so that it is not necessary or needed to rerun these prequeries if the same filters appear again and again. The prequeries (above) provide specific information about the selectivities of filters in a particular tenant's data set. The selectivity of the filter may be an indication of how selective the filter is (e.g., how many rows the filter selects compared to how many rows are available or how many rows are in the table). These prequeries together with a set of statistics (custom usage statistics) that are maintained for each tenant (such as how many rows tenants have in each table, the number of rows that particular users have access to, and numbers of null and non-null values for indexed columns, among other things) provide the information specific to a given tenant that is used to optimize queries and to decide when, and when not, to use the OR/UNION transformation.

In embodiments query optimization may be implemented with a query transformation feature where OR expressions spanning multiple query tables may be split into a UNION ALL (or other clause, such as an operator, combining subqueries into a single query), with each part of the UNION ALL obtained from one of the OR terms. Each subquery in the UNION ALL can exclude rows matching the prior subqueries to eliminate duplicates without introducing a SORT UNIQUE operation. For example, a query spanning multiple query tables may be split into a UNION ALL as in the following transformation:

```
Select Id from Contact where Name = X or
Account where Name = X
is transformed to:
Select Id from Contact where Name = X
UNION ALL
Select Id from Account where Name = X and not
(Contact where Name = X)
```

In embodiments, in a first pass optimization of OR expressions referencing multiple tables, the OR expression may be treated in the same manner as optimizable OR expressions that reference one table, namely, calculate the selectivity of each OR term and add all the selectivities of all the OR terms together to get a selectivity for the total number of rows for the OR expression. Thus, as with a single table OR optimization the number of rows matching each of the OR'ed filters are added together to get the cost (this number would then be divided by the table size to get a selectivity). However, the OR expression may be treated differently when evaluating a multi-table OR expression to account for different size tables. For example, when multi-table OR optimizations are encountered, there may be very different table sizes for each filter, so instead a computation of the fraction of the total rows that match each filter from the corresponding table is made, and then these fractions (or selectivities) are added together to get the cost or total selectivity.

In embodiments, the calculation of selectivity is a measure of the number of rows matching each filter as a fraction of the total number of rows that the tenant has in that table. For example for an expression such as "where account.name='x' or contact.created date=today", prequeries are run (see below) to determine the number of rows in the account table for that tenant with the name 'x', and the number of rows in the account table with the name 'x' is divided by a threshold number of rows, which is a threshold for the number of rows that should be found by a selective filter (if the filter finds more than the threshold, the filter is considered unselective). The threshold for a given table may be the computed automatically by computing the minimum of a hard maximum value for the threshold and a given percentage of the number of rows in the table. So for example, if the hard limit on the value of the threshold is 1000 rows and the threshold is based on 30% of the rows of the table, then for a given table the threshold could be computed form the equation, Threshold=min(0.3*NumberOfRows, 1000), where NumberOfRows is the number of rows is the number of rows in the table. In an alternative embodiment, selectivity may be the number of account records that meet the filter divided by total number of records of the table of interest for that tenant. Thus, if 1 out of 100 account rows matched (i.e., if the account table has only one row with the name 'x'), a selectivity for this term of 0.01 would be computed. Separately, a determination of the number of contacts with a created date of today is made, and divided by the total number of contact rows for that tenant. If, for example, 10 out of 200 contact rows matched, the computed selectivity would be 0.05. In some embodiments there is no measure or estimate of the overlap of the two sets, and instead an optimization is made for the worst case (where the sets are disjoint) by adding the computed separate selectivity for each of the terms together. Thus, in this example the computed selectivity for the OR expression as a whole would be 0.01+0.05=0.06, estimating that 6% of the rows resulting from a join between contact and account would match either the account name filter or the contact created date filter (or both). The assumption that the overlap can be ignored when computing the selectivity tends to work well in practice because of an interest in cases where both terms have low selectivity, and the overlap tends to be small. Even in instances where the overlap is not small, the estimate will be off by at most a factor of the number of terms. For example, if two terms are OR'd, the estimate will be off by at most a factor of 2. In other embodiments, an estimate is made for the overlap, which is then used to compute the selectivity of the filter.

In embodiments, a weighting of selectivities between large and small tables may not be taken into account since it is assumed that joins between tables are not skewed (in other words, in the view resulting from the join, each table contributes essentially the same amount of data). Thus for example, if 1% of the rows from a small table are joined with a large table, it is reasonable to expect that 1% of the rows in the large table will also be taken into account. While the lack of a skew between small and large tables is not always true in practice, the assumption that joins between tables are not skewed is relatively accurate since it is difficult to detect skews. For example based on the assumption of a small skew, a 1% selectivity in a small table is treated as more or less equivalent to a 1% selectivity in a large table. While the cost of data access in the large table is much more significant than that of the cost of accessing data in the small table, access to only about 1% of the rows in the large table is still expected (either directly by an index in the large table or by lookups using a foreign key index for the join). Thus in embodiments equal weight is given to the selectivities of filters in small and large tables. In embodiments, the adding of selectivities may only be conducted with regard to OR expressions. For example, if we have a query such as select . . . from contact where name=x or account.name=x then the result set will include any contact named x plus any accounts named x, so the OR expression in total will be less selective (and therefore gets a higher selectivity value) than either of the two filters individually since the result of the OR expression may include rows that match one filter but not the other. In embodiments, a selectivity measurement with a resultant lower number corresponds to a better filter.

If there are two tables of very different sizes, for example, if there is a Contact table with 100 rows and an Account table with 1000 rows, and there is a query with an or expression such as "Contact.CreatedDate=today OR Account.CreatedDate=today" where 10% of the contacts were created today and 10% of the accounts were created today, then our query will be a union all of two parts—one part starting with the 10 contacts created today and another part starting with the 100 accounts created today. If there are no skews in the joins, then to build the final result, about 200 account records will need to be added to the resulting view. The reason 200 account records will be needed is because there are 100 accounts created today and about 100 accounts related to the 10 contacts created today. In other words, if the data is evenly distributed in both tables, the percentage of records found in the small table correspond to a number of records from the large table that is about the same percentage of the larger table as the percentage of the records found from the smaller table. Consequently the sum of the selectivities of the two tables roughly corresponds to the percentage of records of the lager table that will need to be found to form the resultant view.

Most of the time it is expected that the UNION ALL expression will be more efficient. However, there some situations in which the Select . . . OR statement is more efficient, such as situations where a highly selective filter is applied to the query. For example, if for a query such as, Select Name from Contact, Account where
Contact.Id='003000000000001' and
(Contact.CreatedDate=this year OR Account.CreatedDate=this year).

To compute the above query, the query could be transformed to a UNION ALL, and one part of the query could be primarily generated by applying a CreatedDate index on Contact and another by applying the CreatedDate index on Account. However, it is likely to be more efficient to generate the resultant view by applying the primary key index on Contact to look up the contact by Id, and then applying the OR expression later.

Another case is which the OR expression may be more efficient than the UNION ALL expression is where the OR'ed filters are not very selective, because when both filters are not very selective, implementing the query may involve looking up a large percentage of the rows via an index after transforming the query to a UNION ALL expression, which is likely to be less efficient than performing a full scan and applying the OR filter to all rows, because a full scan tends to be more efficient than looking up a large percentage of the rows by an index. In an extreme example, if an OR of two filters that each matched every row in each table, then transforming the query to a UNION ALL would result in scanning all of the rows twice of each table.

In embodiments, a query optimizer first makes a series of selectivity calculations to determine the best filter for a query, and subsequently generates the actual SQL statement with "hints" to make use of the identified best index. A query optimizer is the component of a database management system that attempts to determine the most efficient way to execute a query. The optimizer considers the possible query plans for a given input query, and attempts to determine which of those plans will be the most efficient. Cost-based query optimizers assign an estimated "cost" to each possible query plan, and choose the plan with the smallest cost. Costs are used to estimate the runtime cost of evaluating the query, in terms of the number of I/O operations required, the CPU requirements. In SQL implementations, a hint is an addition to the SQL standard that instructs the database engine on how to execute the query. For example, a hint may tell the engine to use as little memory as possible (even if the query will run slowly), or to use or not use an index even if a query optimizer would decide otherwise. Hints influence the manner in which the optimization is performed. For example, an index hint specifies an index to be used in the resulting query plan, thereby reducing the set of plans that may be considered by the database. In the query optimizer of an embodiment, OR expressions based on multiple tables (such as "where contact.name='x' or account.name='x'") are treated in just the same way (or in other embodiments in essentially the same way) as the existing single table OR expressions (such as "where account.name='x' or account.created date=today") during the calculation phase. For each type of OR expression, a selectivity is computed for each term and the selectivity's are added together (as above). If the multitable OR expression has the best selectivity out of all of the considered candidates, then an SQL is generated that drives from the indexes corresponding to the various terms of the OR expression (which will require transforming the query into a UNION). It's at this point that the behavior of the current query optimizer diverges from the query optimizer of a single table OR optimization.

In embodiments an algorithm for handling multi table optimizable OR conditions is conducted within the query optimizer framework as follows. First, the query optimizer determines the set of optimizable OR expressions to consider as candidates. For example for an expression in the form of:

(A and B and C) or (D and E) or (F and G)

In order to optimize the query, there needs to be at least one selective term from each branch of the OR expression. In the present example there are 3×2×2=12 optimizable OR expressions based on the filter clauses:

A or D or F
A or D or G
A or E or F
A or E or G
B or D or F
(and so on)

The algorithm of the query optimizer considers the OR combinations in the above example, and only employs the OR expressions where all three terms are optimizable (e.g., as a result of being indexed).

A database index is a data structure that improves the speed of data retrieval operations on a database table. Indexes can be created using one or more columns of a database table, providing the basis for both rapid random look ups and efficient access of ordered records. In a relational database, an index is a copy of one part of a table. Some databases extend the power of indexing by allowing indexes to be created on functions or expressions. Indices can be created on any combination of attributes on a relation. Queries that filter using those attributes can find matching rows randomly using the index, without having to check each row in turn. A Query that utilizes an index is analogous to using the index of a book to go directly to the page on which the information that is being looked for is found, i.e., without having to read the entire book to find what is being looked for. Relational databases typically supply multiple indexing techniques, each of which is optimal for some combination of data distribution, relation size, and typical access pattern.

Thus, for example, in an instance where there are indexes on A, D, F, and G, there will only be 1×1×2=2 candidates to consider in the query optimization, since the other combinations would include at least one filter on a non-indexed column, which cannot be used. Furthermore, in embodiments index joins may be considered as components of an OR expression, so that the expression A or D or (the index join of F and G) may also be considered. An index join is a hash join of several indexes that together contain all the table columns that are referenced in the query. Hash joins are used for joining large data sets. The optimizer uses the smaller of two tables or data sources to build a hash table on the join key in memory. The optimizer then scans the larger table, probing the hash table to find the joined rows. A hash table is a data structure that uses a hash function to map identifying keys (e.g., a person's name) to the values (e.g., telephone numbers) associated with the keys. The hash function is used to transform the key into the index (the hash) of an array element (the slot or bucket) where the corresponding value is to be sought.

Once the query optimizer has identified all of the leading candidates for the query (including the OR expressions), the query optimizer computes a cost value for each candidate and picks the candidate with the lowest cost (e.g., the fewest rows or smallest selectivity).

For each of the candidate optimizable OR expressions, a cost is computed by adding together the costs of the component terms. For example, for an OR expression such as "Account Name='Smith' or Contact Name='Smith'" costs are computed separately for the two filters "Account Name='Smith'" and "Contact Name='Smith'", and the cost of the OR expression is the sum of the cost of both filters.

In general the cost of each filter is based on the fraction of rows in the table that meet the filter's criteria and a selectivity threshold for that table. A selectivity threshold is the maximum number of rows matching a filter for using an index to look up rows by random access rather than doing a full scan of all the rows. In embodiments the selectivity threshold is typically between 10% and 30% of the number of rows in the table, depending on the type of index. (however, other selectivity thresholds may be used in other embodiments). If for example a tenant has 100 account records, and a threshold for using the index is set to be 30, and there are 3 accounts with the name Smith. In this case the cost is computed as 3/30=0.1. In embodiments a query optimizer computes selectivity's relative to the selectivity threshold, rather than computing selectivity's relative to the table size, to account for the fact that some of the indexes used (custom indexes, for example) are more expensive to use than other indexes (such as standard Oracle b-tree indexes). In embodiments there are lower thresholds for the more expensive indexes to account for the expensive indexes extra cost, and so computing the selectivity relative to the threshold is a way of factoring this cost disparity into the calculation. In embodiments, weighting factors may be applied to account for differing costs of using different indexes. Furthermore, for example if a threshold of 100 for the Contact table is assumed, and that there are in fact 5 contacts named Smith, the computed cost is 5/100=0.05 for the Contact table. Subsequently, the costs for the individual components are added together, so in this example a cost of 0.10+0.05=0.15 would be assigned to the OR expression as a whole.

In embodiments, the algorithm for handling multi table optimizable OR conditions subsequently takes the cost estimates for each of the OR expressions and compares the cost estimates of each OR expression to the costs for each of the other leading candidates. If an OR expression with filters based on multiple tables is chosen as the best leading candidate, a transform of the query into a union is made in order to make use of the indexes. Thus, if the determined leading candidate (that is the candidate with the lowest cost) is one query with an OR expression that spans multiple tables, the leading candidate is converted into two or more queries (one query for each term in the OR expression). Continuing with the example above, the algorithm generates one query to look up rows where the Account Name is Smith and a separate query to look up rows where the Contact Name is Smith. The results of these two queries are combined together using a UNION ALL (or other clause, such as an operator, combining subqueries into a single query).

In some embodiments, in order to generate the union, the algorithm creates two internal query definitions (or more than two query definitions if there are more than two terms in the OR expression). In other words, the algorithm creates two queries that are internal in the sense that the user does not see the queries and the queries may be generated a code that is equivalent to the SQL query rather than an actual SQL query. Each of the internal query definitions are based on a copy of the original query, but with added filters. The internal query definition may be a data structure that holds a set of information that represents a database query as defined by an end user, prior to optimization. and may contain a list of display columns to be selected, a set of tables to query, a set of filters to apply, and which column to order the results by, for example.

In embodiments of the algorithm for handling multi-table optimizable OR conditions a first query definition (or union component) is the original query plus the first filter from the OR expression. Continuing with the example above, if the original query has the filter expression "Account Name='Smith' or Contact Name='Smith'", then the first union component would have the filter expression "(Account Name='Smith' OR Contact Name='Smith') AND Account Name='Smith'". It is noted that the original OR expression could be eliminated, though it need not be. The elimination of the original OR expression will not affect the results of the query.

The second union component formed with the algorithm takes the second filter term from the OR expression, and also the negation of the first filter. By adding the negation of the first filter, the algorithm ensures that duplicates are not introduced into a result set with the UNION ALL operation.

It is noted that it is possible to use a UNION database operator in place of a UNION ALL to eliminate duplicates, however, the UNION operator adds additional expense to the query and may even eliminate too many duplicates—for example if there are two rows in the database with identical values, a UNION operator would eliminate one of the identical values, when the return of both rows with identical values is required by the query. It may be desirable for the algorithm to only avoid introducing additional duplicate rows in a query from individual rows in the database that match both of the filters. Thus, the second union component would have the filter expression as follows:

(Account Name='Smith' OR Contact Name='Smith') AND

Contact Name='Smith' Account Name!='Smith'

(where "!=" is used as a "not equal" operator). As was noted with the first union component, the original OR expression could be eliminated, but it is not necessary to do so.

The third and subsequent union components formed with the algorithm are produced in the same manner as the second, with an additional positive filter based on the Nth term of the original OR expression and additional negative filters based on the N−1 preceding terms from the OR expression to avoid introducing duplicates into the result.

In embodiments the algorithm supplies the set of generated query definitions (the union components) to a generator of Union queries, which may be named a UnionQueryGenerator. The UnionQueryGenerator may invoke code for generating SQL code for each component of the Union statement. These SQL statements are concatenated together using UNION ALL (or other clause, such as an operator, combining subqueries into a single query) expressions. The UnionQueryGenerator may also contain logic to ensure that each component query contains the same set of expressions (in the same order) in the select clause. For example, if one union component is missing a select term that is present in the other union components, then the union query generator will select a null as a placeholder to replace the missing select term in that union component. In an embodiment, the union query generator also adds SQL clauses for sorting and grouping and/or aggregating queries, such as GROUP BY, HAVING, or ORDER BY clauses, which must be done outside of the UNION in order to get correct results, and to avoid conflicts with the grouping and/or aggregate queries.

Thus, when the multi-table OR expression is chosen as the filter for the query, then the query may be transformed into a union. The transformation may be implemented using the UnionQueryGenerator to transform the multi-table query, as illustrated in the example above, from an OR expression into a UNION ALL. A new query definition for each UNION term may be generated and transferred to the UnionQueryGenerator to produce the final structured query language.

In embodiments, the new OR query optimizations may be able to make use of any of the existing standard or custom optimizations for each individual filter involved in the OR expression, including standard Oracle or other database indexes, custom indexes, other custom accelerator tables such as the search name lookup table, and performs a join among multiple indexes of the same table.

Custom indexes are designed to access data from multi-tenant databases with multi-tenant custom schema. In a multi-tenant architecture, it is possible to index a column in the database for every individual tenant. However, it may not be practical to index fields that only a few organizations or tenants or just one organization or tenant is using and filtering. In cases where it is practical to index fields for just a few tenants or just one tenant. Custom indexes provide a way to index a field for just one organization or tenant that allows a multi-tenant database administrator or provider to tune database schema differently for different tenant customers in an efficient manner. As described above, multi-tenant tables store data for many tenants in a single table. A traditional database index that is created for use with a multi-tenant table will cover the entire table, and all tenants' data is indexed. Sometimes, there is a need to index the data for one particular tenant by a given field, however the index for the particular tenant would not be useful in general for other tenants. (The use of an index for a particular tenant is common with custom fields in a multi-tenant table or database, where a set of multipurpose database columns are used to store custom field data for all tenants and one custom field "slot" may store different types of data for different tenants. Slot 1 may be an external source system identifier for one tenant, and slot 1 may be a text description or a "do not call" flag for another tenant.) The custom index system allows the indexing data for a single tenant without the overhead of indexing the entire table by copying one tenant's data into a separate custom index table. Thus, if for example there are 500 custom field slots, there may be an index for each slot for one or more tenants via custom indexes, without having to build 500 b-tree indexes on the entire table (which would make inserts and updates to the table very slow).

When a field in a database is custom indexed, all of the data from that field is copied over into a denormalized custom index value table. The denormalized custom index value table has a few columns. An example of column headers for a custom index value table may be as follows:

organization_id
key_prefix (which identifies which table is indexed)
index_number (which identifies which column is indexed)
string_value, date_value, number_value (which is the actual field data)
entity_id (which is the primary key value for the base table row)

The custom index value table may be another multi-tenant table. So rather than having one table for each custom index, there may be one big table for all custom indexes. That one big table may be indexed with leading columns of organization_id, key_prefix, and index number such that to scan one logical "custom index" a range scan may be performed on an index, the full custom index value table for a particular combination of values for the three leading columns. When a row is inserted, updated, or deleted in a base table, there may also be a need to maintain the corresponding row(s) in the custom index table. Both standard and custom fields can be indexed, and nearly all datatypes may be indexed.

When a user runs a query with a filter on a custom indexed column, a runtime decision is made about the selectivity of the filter via the use of statistics that have been gathered (e.g., based on the number of non-null values, number of distinct values, high cardinality values) as a first pass approximation. If necessary, a prequery is run against the custom index to determine if the filter is selective. If the custom filter is selective (and no other indexed filter is better), the query is dynamically rewritten to lead from the custom index table and join to the main table via the primary key. In other words, a join order for the query is specified where the custom index table is the first table in the join order.

Embodiments have the ability to join two custom indexes together. If there are filters on two custom indexed fields on the same table, a scan is made of both custom indexes and the scans are intersected (in other words a hash join may performed between the two custom indexes to produce a result containing just those primary keys that are matched in both of the two index scans) before joining the scans back to the main table. Sharing joins may also be directly applied against the custom index table when sharing is based upon the primary key. If a filter on a custom indexed field is not selective, then the custom index table is not joined.

The accelerator tables such as custom indexes and search name lookup tables are extra indexed tables that can be added to a query for a multi-tenant database to give the query a good driving index. For example, an account custom field table may have five hundred columns which can be used as custom fields by each tenant in a multi-tenant database. Each tenant may assign a different datatype to each column, and each tenant may use the columns quite differently. If one customer uses a custom field slot as an external source system identifier and runs queries to find particular records based on that identifier, then it may be desirable for the multi-tenant database operator to have an index on the column of the custom field slot in order to make the lookups fast. The database operator cannot add an index directly to the custom field table, because the column contains data of different types for each tenant and because the overhead of indexing the column for the entire database table for the benefit of one tenant is too great. Therefore, instead a copy of data regarding just that one tenant and for that column is placed into a custom index table (which has an indexed column for each datatype) along with the corresponding primary key of each row. Then when the customer queries for a particular source system identifier, a query may be made using the custom index table to first look up the primary key(s) for the matching row(s) quickly, and subsequently join the primary keys to the account data to obtain the rest of the data requested by the user's query.

In embodiments a table called a search_name_lookup table may be employed that is similar to the custom_index table, but the search_name_lookup table stores the data for all name fields, and the values in the search_name_lookup table are normalized differently (nonalphanumeric characters are stripped out, and there are entries for <first name> <last name> and for <last name> <first name> so that names can be looked up using the proper format according to the user's locale.)

Figure 3:
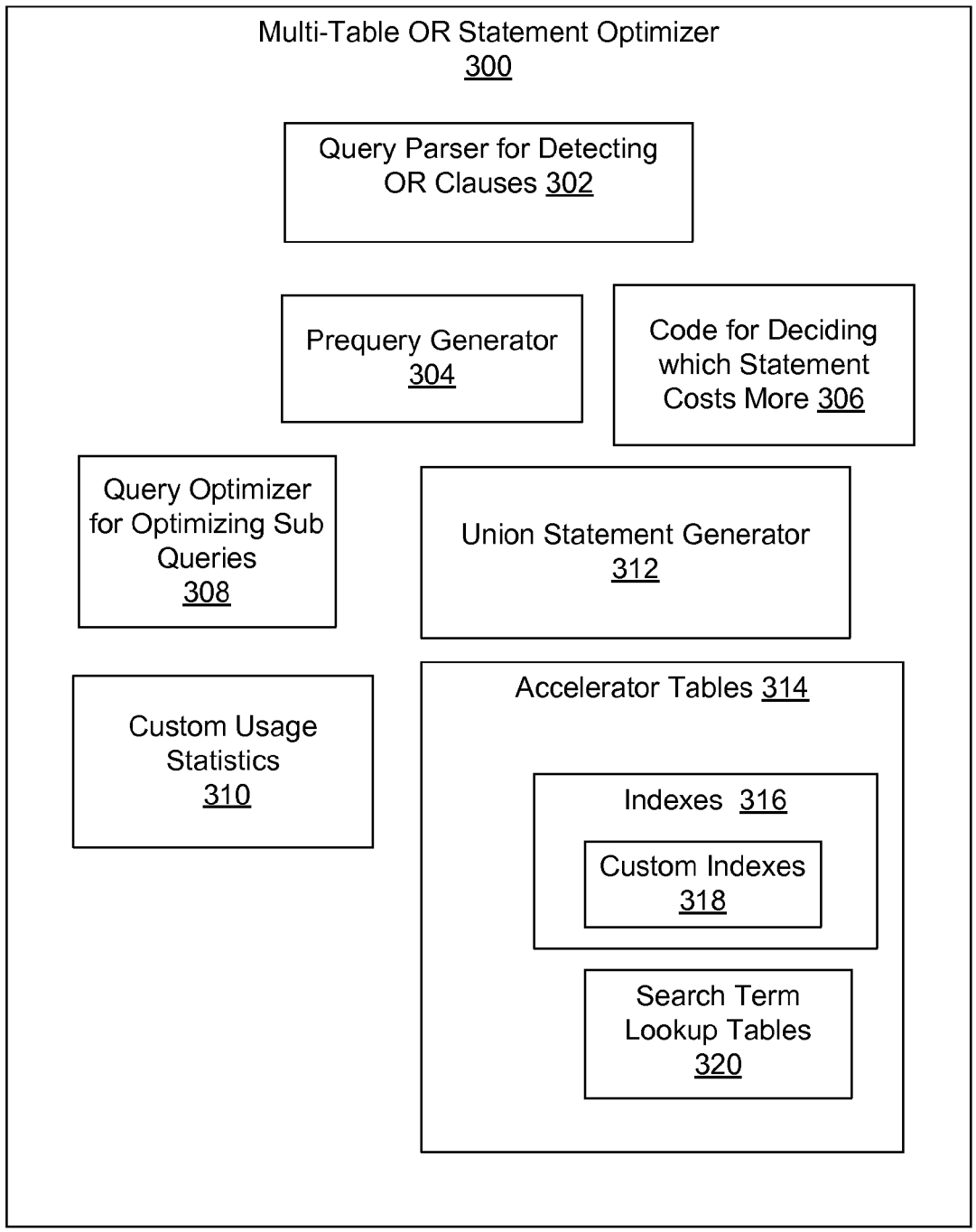
FIG. 3 illustrates a block diagram of an embodiment of a multi-table OR statement optimizer.

FIG. 3 illustrates a block diagram of a multi-table OR statement optimizer 300 that may be found in program code 26 that implements various functions of system 16 of FIG. 1 and FIG. 2. Multi-table OR statement optimizer 300, may include a query parser for detecting OR clauses 302, a pre-query generator 304, code for deciding which statement costs more 306, a query optimizer for optimizing sub queries 308, custom usage statistics 310, and accelerator tables 312. The accelerator tables may include indexes 316 and search term lookup tables 320. Indexes 316 may include custom indexes 318. In other embodiments, multi-table OR statement optimizer 300 may not have the same elements as those listed above and/or may have other elements instead of, or in addition to, those listed above.

The multi-table OR statement optimizer 300 is an example of the software and computing components for optimizing OR expression filters referencing different logical tables according to embodiments. The query parser for detecting OR clauses 302 takes a user query as received by system 16 (FIGS. 1 and 2) via user system 12 (FIGS. 1 and 2), and parses the query to determine the separate OR clauses within the user query. The prequery generator 304 generates queries that are run to probe the selectivity of a given filter (OR expression) in order to gain more information for optimization of the main query (as previously described in greater detail above). The code for deciding which statement costs more 306 contains the code for calculating a computational cost for each query candidate as parsed by the query parser 302. Query Optimizer for Optimizing Sub Queries 308 is an algorithm in the form of a query optimizer for determining the set of optimizable OR expressions to consider as candidates based on the costs calculated by the code for deciding which statement costs more 306. Custom usage statistics 310 are a representation of custom usage statistics for each tenant (how many rows tenants have in each table, the number of rows that particular users have access to, and numbers of null and non-null values for indexed columns, among other things). The custom usage information that may be stored for each tenant is utilized to optimize queries. If a query has OR expressions referencing multiple tables, the query that was converted into separate queries by the query parser 302 for each OR term, has the results of the separate queries combined with UNION ALL operators (or other clause, such as an operator, combining subqueries into a single query) as represented by the union statement generator 312. Accelerator tables 314 may be made up of indexes 316, custom indexes 318, and search term lookup tables 320. As explained above, the accelerator tables such as custom indexes and search name lookup tables are extra indexed tables that can be added to a query for a multi-tenant database to give the query a good driving index.

Figure 4:
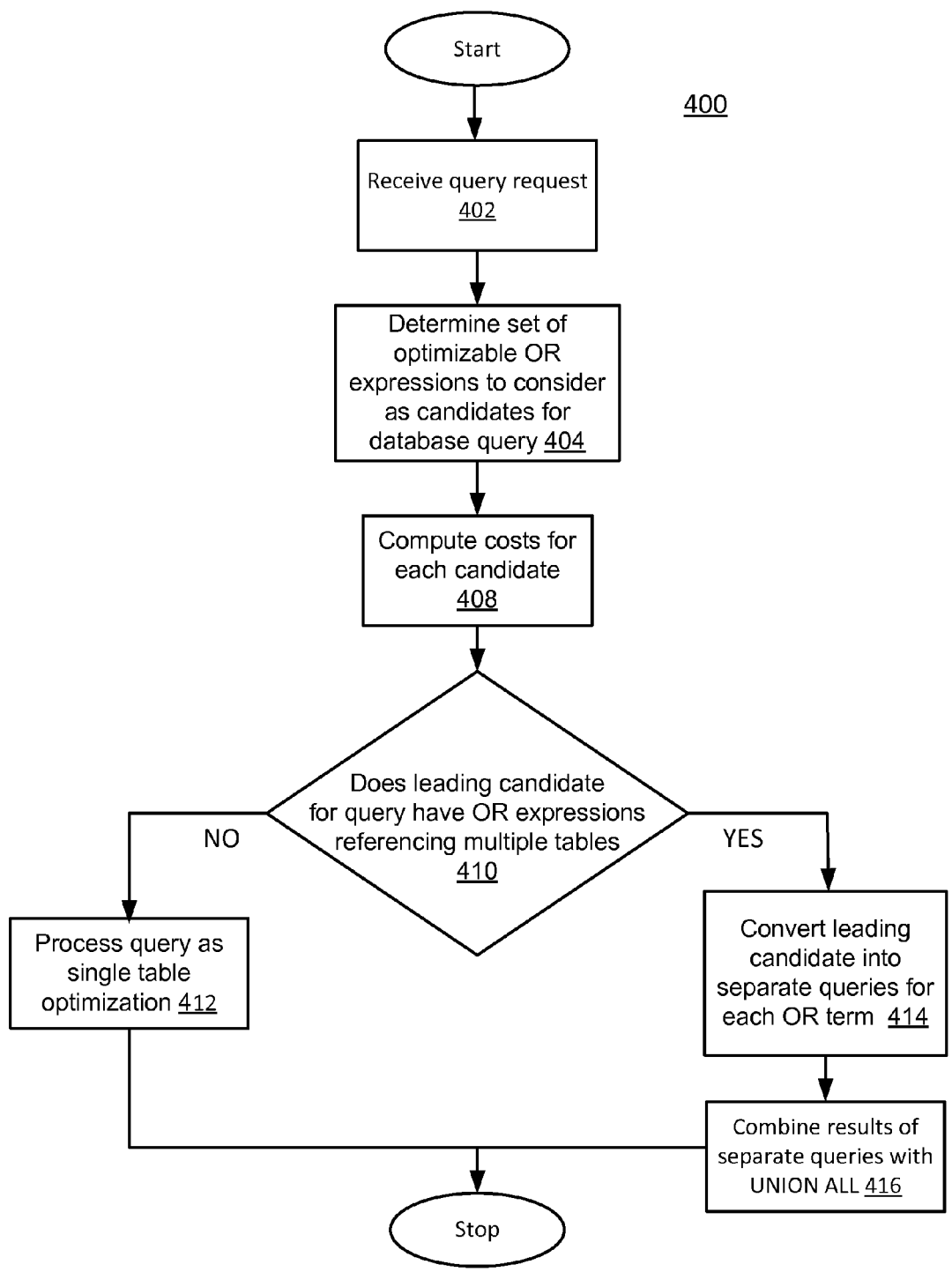
FIG. 4 shows a flowchart of an example of a method of optimizing OR expression filters referencing different logical tables.

FIG. 4 shows a flowchart of an example of a method 400 of optimizing OR expression filters referencing different logical tables. In step 402 a user query is received by system 16 (FIGS. 1 and 2) via user system 12 (FIGS. 1 and 2). In step 404 a determination of optimizable OR expressions to consider for candidates for a database query is made based on whether each term within the OR expression is indexed. In step 406 a computational cost is calculated for each query candidate. When the leading candidate for a query does not have any OR expressions referencing multiple tables (decision step 410 is NO), the query is processed as a standard single table optimization (step 412), and the process concludes. When the leading candidate for a query has OR expressions referencing multiple tables (decision step 410 is YES), the leading candidate is converted into separate queries for each OR term (step 414), and the results of the separate queries are combined with UNION ALL clause (or other clause, such as an operator, combining subqueries into a single query). In other embodiments, the steps of method 400 may be performed in another order. Any combination of steps and subsets of the steps listed above as part of method 400 may be used to form their own method. In another embodiment, although depicted as distinct steps in FIG. 4, steps 402-414 may not be distinct steps. In other embodiments, method 400 may not have all of the above steps and/or may have other steps in addition to, or instead of, those listed above. The steps of method 400 may be performed in another order. Subsets of the steps listed above as part of method 400 may be used to form their own method.

Figure 5:
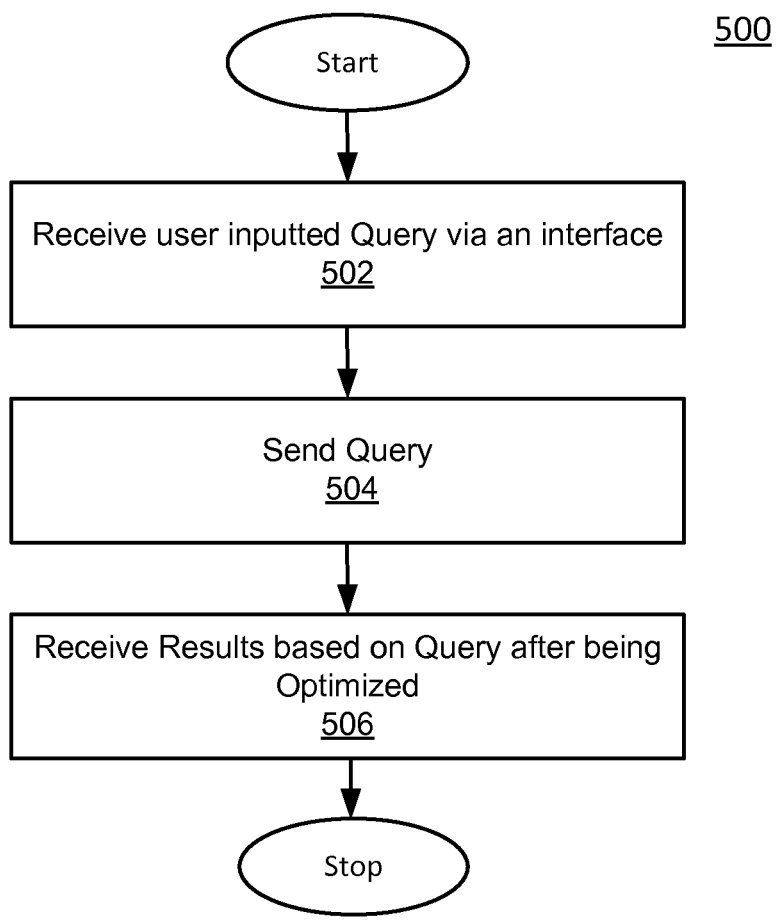
FIG. 5 shows a flowchart of an example of a method at a user interface of optimizing OR expression filters referencing different logical tables.

FIG. 5 shows a flowchart of an example of a method 500 at a user interface for optimizing OR expression filters referencing different logical tables. In step 502 a user query is inputted via user system 12 (FIGS. 1 and 2). The user query may be generated automatically as a result of the user selecting items to search for via the user interface. In step 504 the user query is sent via user system 12 to system 16 (FIGS. 1 and 2). In step 506 the results of the user query based on optimized OR expressions (which were optimized using method 400 and the methods described above) that were found in databases within the system 16 are returned and received by the user via user system 12. In other embodiments, the steps of method 500 may be performed in another order. Any combination of steps and subsets of the steps listed above as part of method 500 may be used to form their own method. In another embodiment, although depicted as distinct steps in FIG. 5, steps 502-506 may not be distinct steps. In other embodiments, method 500 may not have all of the above steps and/or may have other steps in addition to, or instead of, those listed above. The steps of method 500 may be performed in another order. Subsets of the steps listed above as part of method 500 may be used to form their own method.

Method for Using the Environment (FIGS. 1 and 2)

Figure 6:
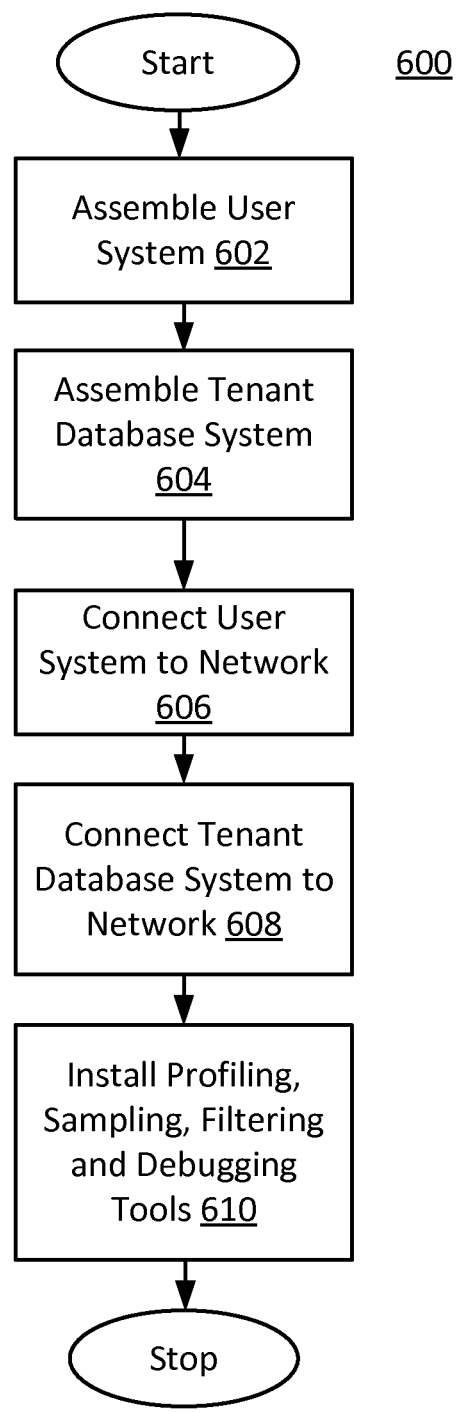
FIG. 6 shows a flowchart of an example of a method of using the environment of FIGS. 1 and 2.

FIG. 6 shows a flowchart of an example of a method 600 of using environment 10. In step 610, user system 12 (FIGS. 1 and 2) establishes an account. In step 612, one or more tenant process space 104 (FIG. 2) are initiated on behalf of user system 12, which may also involve setting aside space in tenant space 112 (FIG. 2) and tenant data 114 (FIG. 2) for user system 12. Step 612 may also involve modifying application metadata to accommodate user system 12. In step 614, user system 12 uploads data. In step 616, one or more data objects are added to tenant data 114 where the data uploaded is stored.

In step 618, the method for query optimization in a database network system may be implemented. In another embodiment, although depicted as distinct steps in FIG. 6, steps 602-618 may not be distinct steps. In other embodiments, method 600 may not have all of the above steps and/or may have other steps in addition to, or instead of, those listed above. The steps of method 600 may be performed in another order. Subsets of the steps listed above as part of method 600 may be used to form their own method.

Method for Creating the Environment (FIGS. 1 and 2)

Figure 7:
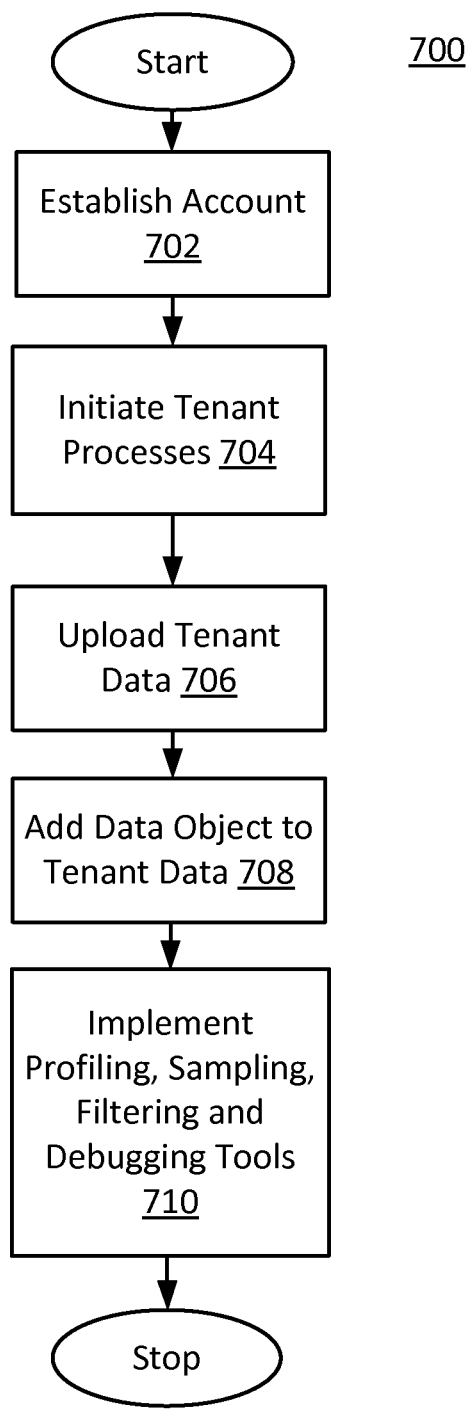
FIG. 7 shows a flowchart of an example of a method of making the environment of FIGS. 1 and 2.

FIG. 7 is a method of making environment 10, in step 702, user system 12 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 704, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers 100$_1$-100$_N$, system process space 102, tenant process spaces 104, tenant management process space 110, tenant space 112, tenant data 114, and application metadata 116 (FIG. 2).

In step 706, user system 12 is communicatively coupled to network 104. In step 708, system 16 is communicatively coupled to network 104 allowing user system 12 and system 16 to communicate with one another (FIG. 2). In step 710, one or more instructions may be installed in system 16 (e.g., the instructions may be installed on one or more machine readable media, such as computer readable media, therein) and/or system 16 is otherwise configured for performing the steps of methods for query optimization in a database network system. For example, as part of step 710, one or more instructions may be entered into the memory of system 16 for query optimization in a database network system.

In another embodiment, although depicted as distinct steps in FIG. 7, steps 702-710 may not be distinct steps. In other embodiments, method 700 may not have all of the above steps and/or may have other steps in addition to, or instead of, those listed above. The steps of method 700 may be performed in another order. Subsets of the steps listed above as part of method 700 may be used to form their own method.

Extensions and Alternatives

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A machine-implemented method comprising:
a computer system including one or more computers, which includes at least a processor system having at least one processor, receiving a user query;
the processor system parsing the user query and automatically generating a set of parallel subqueries that in combination are equivalent to the user query in results that are expected to be returned, where the parsing of the user query determines one or more OR clauses to be within the user query;
the computer system forming a query that is applied to multiple database tables, if a cost of the user query is expected to be more than the query formed, the forming of the query being by at least forming a clause that combines the set of parallel subqueries into a query equivalent to the user query;
the method also including at least
generating, by the computer system, prequeries the prequeries being a series of queries that are run to determine an estimate of a cost of each of the parallel subqueries;
optimizing, by the computer system, individual subqueries of the parallel subqueries with a query optimizer by, for each of the individual subqueries, the query optimizer determining which of a plurality of methods of performing a query has a lowest calculated cost;
calculating, by the computer system, computational costs of the filters in the subqueries by at least:
determining, by the computer system, for each of the subqueries, selectivities of the filters, each selectivity of a filter being determined by counting, by the computer system, how many records are selected by applying the filter, or
by determining, by the computer system, what fraction of the records of a total number of records in a table match each filter;
summing, by the computer system, the selectivities of the filters;
determining, by the computer system, whether the cost of the user query is expected to be more than the query formed with the clause that combines the set of parallel subqueries where the combining of the set of parallel subqueries is performed by at least comparing the computational costs of the filters in the subqueries to the user query;
where the prequeries include at least range scans against an index, and there is at least a row limit to stop the range scan when it is determined that a particular filter is not selective;
where the index includes at least a custom index, where the custom index accesses data belonging to a specified user from the database network that contains data belonging to a series of separate users, or the index includes at least an accelerator table that is an indexed table that is added to the user query to give the user query a driving index;
where the computer system includes a database network system that is a multi-tenant database system.

2. The method of claim 1 where the clause includes at least a UNION ALL clause.

3. The method of claim 1 where the index includes at least a custom index, where the custom index accesses data belonging to a specified user from the database network that contains data belonging to a series of separate users.

4. The method of claim 1 where the index includes at least a form of accelerator table that is an extra indexed table that is added to the user query to give the user query a driving index.

5. The method of claim 1 where the computer system includes a database network system that is a multi-tenant database system.

6. The method of claim 1, at least a first subquery being performed for a first table and at least a second subquery being performed for a second table that is a different size than the second table, and the computational cost being based on the summing of the selectivities despite the first table and second table having different sizes.

7. The method of claim 1, further comprising
receiving user input;
automatically forming the user query in a database language based on the user input; the user query parsed being in the database language.

8. The method of claim 1, the parallel queries including at least a first subquery that is a performed for a first table and at least a second subquery that is performed for a second table that is different than the second table.

9. The method of claim 1, the combined query including the subqueries, and each subquery being mutually exclusive of all other subqueries.

10. The method of claim 1, the database having many tenants, the method further comprising:
optimizing each subquery with a query optimizer based on the lowest calculated cost of the subquery for a tenant associated with the user.

11. The method of claim 1 where the computer system includes a database network system that is a multi-tenant database system;
the user being associated with one of many tenants of the multi-tenant database that share at least one table, each tenant having a different portion of the table and the database that the tenant has access to;
the combined query being limited to the portion of the multi-tenant database that the tenant has access to;
the method further comprising computing the cost of the query having the clause based on the portion of the multi-tenant database that the tenant has access to;
wherein an optimization of the query is specific to the tenant and the query.

12. The method of claim 1, further comprising:
determining a maximum limit as to the number of records returned;
a threshold percentage of records of a table, where a query term that returns more than the threshold percentage of records is considered unselective;
setting a threshold number of rows as a minimum of the maximum number of rows and a product of the threshold percentage and the rows of the table;
computing a selectivity as a number of rows returned divided by the threshold number of rows; and
a filter that is not selective on a corresponding custom index table is not joined to other custom index tables as part of the performing the query.

13. A non-transitory machine-readable medium carrying one or more sequences of instructions for optimizing queries in a database network system, which instructions, when executed by a computer system including one or more computers having a processor system including one or more processors, cause a method to be carried out, the method comprising:
receiving a user query at the computer system;
parsing, by the processor system, the user query and automatically generating a set of parallel subqueries that in combination are equivalent to the user query in results that are expected to be returned; and
forming, by the processor system, a query that is applied to multiple database tables, if a cost of the user query is expected to be more than the query formed, the forming of the query being by at least forming a clause that combines the set of parallel subqueries into a query equivalent to the user query
the method also including at least
generating, by the processor system, prequiries that are a series of queries that are run to determine an estimate of a cost with each of the parallel subqueries;
optimizing, by the computer system, individual subqueries of the parallel subqueries with a query optimizer by, for each of the individual subqueries, the query optimizer determining which of a plurality of methods of performing a query has a lowest calculated cost;
calculating, by the computer system, computational costs of the filters in the subqueries by at least determining, by the computer system, for each of the subqueries, selectivities of the filters, each selectivity of a filter being determined
by counting, by the computer system, how many records are selected by applying the filter, or
by determining, by the computer system, what fraction of the records of a total number of records in a table match each filter;
summing, by the computer system, the selectivities of the filters;
determining, by the computer system, the cost of the user query is expected to be more than the query formed with the clause, combining the set of parallel subqueries by at least comparing the computational costs of the filters in the subqueries to the user query;
where the prequeries include at least range scans against an index, and there is at least a row limit to stop the range scan when it is determined
that a particular filter is not selective;
where
the index includes at least a custom index, where the custom index accesses data belonging to a specified user from the database network that contains data belonging to a series of separate users, or
the index includes at least a form of accelerator table that is an indexed table that is added to the user query to give the user query a driving index; and
where the computer system includes a database network system that is a multi-tenant database system.

14. A computer system having one or more computers for optimizing queries in a database network system, the computer system comprising:
a processor system including at least one processor; and
a memory system including a machine readable medium having stored thereon one or more sequences of instructions which, when executed, cause a method to be carried out,
the method including at least
receiving a user query at the computer system;
parsing, by the processor system, the user query and automatically generating a set of parallel subqueries that in combination are equivalent to the user query in results that are expected to be returned, where the parsing, of the user query determines one or more OR clauses to be within the user query;
forming, by the processor system, a query that is applied to multiple database tables, if a cost of the user query is expected to be more than the query formed, the forming of the query being by at least forming a clause that combines the set of parallel subqueries into a query equivalent to the user query the method also including at least generating prequeries that are a series of queries that are run to determine an estimate of a cost with each of the parallel subqueries;

optimizing, by the computer system, individual subqueries of the parallel subqueries with a query optimizer by, for each of the individual subqueries, the query optimizer determining which of a plurality of methods of performing a query has a lowest calculated cost;

calculating, by the computer system, computational costs of the filters in the subqueries by at least determining, by the computer system, for each of the subqueries, selectivities of the filters, each selectivity of a filter being determined by counting, by the computer system, how many records are selected by applying the filter, or by determining, by the computer system, what fraction of the records of a total number of records in a table match each filter;

summing, by the computer system, the selectivities of the filters;

determining, by the computer system, whether the cost of the user query is expected to be more than the query formed with the clause, combining the set of parallel subqueries by at least comparing the calculated computational costs of the filters in the subqueries to the user query;

where the prequeries include at least range scans against an index, and there is at least a row limit to stop the range scan when it is determined that a particular filter is not selective;

where the index includes at least a custom index, where the custom index accesses data belonging to a specified user from the database network that contains data belonging to a series of separate users, or the index includes at least a form of accelerator table that is an extra indexed table that is added to the user query to give the user query a driving index; and where the computer system includes a database network system that is a multi-tenant database system.

\* \* \* \* \*